US011185469B2

(12) United States Patent
 Fotedar (10) Patent No.: US 11,185,469 B2
(45) Date of Patent: Nov. 30, 2021

(54) FLEXIBLE CROSS SLIT HOUSING WITH PRINTED TEMPERATURE SENSORS

(71) Applicant: Palo Alto Research Center Incorporated, Palo Alto, CA (US)

(72) Inventor: Shiveesh Fotedar, Sunnyvale, CA (US)

(73) Assignee: Palo Alto Research Center Incorporated, Palo Alto, CA (US)

(*) Notice: Subject to any disclaimer, the term of this patent is extended or adjusted under 35 U.S.C. 154(b) by 384 days.

(21) Appl. No.: 16/232,670

(22) Filed: Dec. 26, 2018

(65) Prior Publication Data

US 2020/0206078 A1 Jul. 2, 2020

(51) Int. Cl.
 *G01K 1/00* (2006.01)
 *G01K 7/00* (2006.01)
 *G01K 13/00* (2021.01)
 *A61J 1/05* (2006.01)
 *G01K 1/02* (2021.01)
 *G01K 1/14* (2021.01)

(52) U.S. Cl.
 CPC ............... *A61J 1/05* (2013.01); *G01K 1/026* (2013.01); *G01K 1/14* (2013.01); *G01K 13/00* (2013.01); *A61J 2200/72* (2013.01)

(58) Field of Classification Search
 USPC ................................. 374/208, 163, 166, 141
 See application file for complete search history.

*Primary Examiner* — Mirellys Jagan
(74) *Attorney, Agent, or Firm* — Shun Yao; Park, Vaughan, Fleming & Dowler LLP (57) ABSTRACT

One embodiment provides an apparatus, comprising: a first flexible substrate with a plurality of slits and at least one sensor, wherein the slits are arranged around a center of the first flexible substrate, wherein the sensor is arranged between a pair of the slits, and wherein when an object is inserted into an orifice created by the slits, the sensor is configured to maintain contact with the object, thereby allowing a measurement of a characteristic of the object over a predetermined period of time.

20 Claims, 5 Drawing Sheets

FLEXIBLE CROSS SLIT HOUSING WITH PRINTED TEMPERATURE SENSORS

BACKGROUND

Field

This disclosure is generally related to sensors. More specifically, this disclosure is related to a flexible cross slit housing with printed temperature sensors.

Related Art

Vaccines are sensitive biological products. Some vaccines are sensitive to temperature changes, including temperatures above or below a certain threshold. The potency of a vaccine (i.e., the ability of the vaccine to adequately protect the vaccinated patient) may diminish if the vaccine is exposed to an inappropriate temperature. A temperature monitoring system may be used to ensure the potency of a vaccine (e.g., during storage and transit).

One conventional temperature monitoring system is a vaccine vial monitor (VMM), which is a thermochromic label (e.g., a sticker) place on a vial containing a vaccine. The VMM label can provide a visual indication of whether the vaccine has been kept at a temperature which preserves it potency, e.g., a label which changes color as it is exposed to heat over time. However, VMMs only measure exposure to heat, and do not measure exposure to freezing temperatures.

Another conventional temperature monitoring system is an electronic freeze indicator (EFI), which can be placed in a refrigerated unit (or a "refrigerator"). An EFI can indicate whether the temperature drops below freezing for more than a predetermined period of time. However, in practice, only a single EFI is required per refrigerator, and the single EFI can only measure the temperature in the single refrigerator. Any temperature gradients in the refrigerator may affect readings obtained from the EFI. For example, some refrigerators have vents which allow cold air or hot air to flow in varying locations in the refrigerator, resulting in a gradient of temperatures which cannot be accurately measured by the single EFI in the refrigerator. Given many vaccine vials per refrigerator, most of those vials cannot be located in close proximity of the EFI, thus rendering the measurements of the EFI inaccurate across all of the vaccine vials in a refrigerator.

Furthermore, EFIs may require a significant amount of human intervention. EFIs may require the use of a digital data logger (DDL), which needs to be checked and monitored at regular intervals by a human. In addition, a standard practice for placing vaccine vials in a refrigerator requires a high level of human intervention, e.g., to place the vials in areas known to have a more consistent temperature, such as in the center of the refrigerator. Another standard practice involves human intervention to pack water bottles throughout the refrigerator (e.g., in the doors and on the top and bottom shelves) to act as a temperature buffer. However, this amount of human intervention can be prone to errors.

Thus, current temperature monitoring systems may be both inadequate and inaccurate.

SUMMARY

One embodiment provides an apparatus, comprising: a first flexible substrate with a plurality of slits and at least one sensor, wherein the slits are arranged around a center of the first flexible substrate, wherein a sensor is arranged between a pair of the slits, and wherein when an object is inserted into an orifice created by the slits, the sensor is configured to maintain contact with the object, thereby allowing a measurement of a characteristic of the object over a predetermined period of time.

In some embodiments, the slits are further arranged equally around and radiating outward from the center of the first flexible substrate, and the sensor is further arranged equidistantly between the pair of the slits.

In some embodiments, the first flexible substrate is adhered to a second substrate. The second substrate is one or more of: a second flexible substrate; and a non-flexible substrate.

In some embodiments, the object has a symmetrical shape.

In some embodiments, the object is one or more of: a container which holds a liquid, wherein when the container is inserted into the orifice, the sensor is configured to maintain contact with the container; and a solid physical object, wherein when the solid physical object is inserted into the orifice, the sensor is configured to maintain contact with the solid physical object.

In some embodiments, the apparatus further comprises: a second flexible substrate which includes a plurality of first flexible substrates arranged in a uniform or a non-uniform manner on the second flexible substrate.

In some embodiments, the slits are further arranged in a non-uniform manner around the center of the first flexible substrate, and the object has a non-symmetrical shape.

In some embodiments, the sensor is printed electronically onto the first flexible substrate. The sensor includes a temperature sensor, and the measured characteristic of the object includes a temperature of the object.

In some embodiments, the plurality of slits includes at least three slits, and the at least one sensor includes at least three sensors.

Another embodiment provides a first flexible substrate, comprising: a plurality of slits and at least one sensor, wherein the slits are arranged around a center of the first flexible substrate, and wherein a sensor is arranged between a pair of the slits. The first flexible substrate further comprises: an insertion means for holding an object inserted into an orifice created by the slits and maintaining contact by the sensor with the object; and a measuring means for monitoring, over a predetermined period of time, a characteristic obtained from the sensor in contact with the inserted object. In some embodiments, the sensor is printed electronically onto the first flexible substrate, the sensor includes a temperature sensor, and the monitored characteristic obtained from the temperature sensor includes a temperature of the object.

In some embodiments, the first flexible substrate further comprises an adhesive means for adhering the first flexible substrate to a second substrate. The second substrate is one or more of: a second flexible substrate; and a non-flexible substrate.

Another embodiment provides a method for facilitating temperature measurement of an object. During operation, the system inserts the object into an orifice of a flexible substrate, wherein the flexible substrate has a plurality of slits and at least one sensor, wherein the slits are arranged around a center of the flexible substrate, wherein a sensor is arranged between a pair of the slits, and wherein the orifice is created by the slits. The system maintains contact by the sensor with the inserted object. The system monitors, over a predetermined period of time, a characteristic obtained from the sensor in contact with the inserted object.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The embodiments described herein solve the problem of efficiently and effectively monitoring a characteristic of a physical object, such as the temperature of a vaccine vial, by using a thin flexible cross slit housing with printed temperature sensors in direct and constant contact with the physical object.

As discussed above, vaccines are sensitive biological products which can be sensitive to temperature changes (including temperatures above or below a certain threshold). The vaccine potency may diminish if the vaccine is exposed to an inappropriate temperature. A temperature monitoring system may be used to ensure the potency of a vaccine (e.g., during storage and transit). One conventional temperature monitoring system is a vaccine vial monitor (VMM), which is a thermochromic label (e.g., a sticker) place on a vial containing a vaccine. The VMM label can provide a visual indication of whether the vaccine has been kept at a temperature which preserves it potency. For example, the VMM can be a label which is a heat-sensitive square within a circle. As the VMM is exposed to heat, the color of the square can change color with time and with increasing speed in hotter conditions. If the square becomes the same color as the circle or becomes darker than the circle, this can indicate that the vaccine contained in the vial is damaged (i.e., no longer has sufficient potency) and should be discarded. However, VMMs only measure exposure to heat, and do not measure exposure to freezing temperatures.

Another conventional temperature monitoring system is an electronic freeze indicator (EFI). An EFI can be a tag which monitors the temperature of a product by, e.g., adhering the tag to the product, placing the tag in a refrigerator, or inserting a probe in a buffer solution. The EFI tag can indicate whether the temperature drops below freezing for more than a predetermined period of time.

However, in practice, only a single EFI is required per refrigerator, and the single EFI can only measure the temperature in the single refrigerator. Any temperature gradients in the refrigerator may affect readings obtained from the EFI. For example, some refrigerators have vents which allow cold air or hot air to flow in varying locations in the refrigerator, resulting in a gradient of temperatures which cannot be accurately measured by the single EFI in the refrigerated unit. As a general rule, the closer the proximity of the EFI to the actual location where the vaccines are stored, the more accurate the EFI reading will be to the actual temperature of the vaccine. However, given that there are typically many vaccine vials per refrigerator, most of those vials cannot be located in close proximity of the EFI. This "non-locality" problem can thus render the measurements of the EFI inaccurate across all of the vaccine vials in a refrigerator. That is, the EFI cannot provide individual measurements for each vial, and can instead only provide an average temperature for all vials in a refrigerator.

Furthermore, EFIs may require a significant amount of human intervention. EFIs may require the use of a digital data logger (DDL), which needs to be checked and monitored at regular intervals by a human. In addition, a standard practice for placing vaccine vials in a refrigerator requires a high level of human intervention, e.g., to place the vials in areas known to have a more consistent temperature, such as in the center of the refrigerator. Another standard practice involves human intervention to pack water bottles throughout the refrigerator (e.g., in the doors and on the top and bottom shelves) to act as a temperature buffer. However, this amount of human intervention can be prone to errors. Indeed, between 14% and 35% of refrigerators or transport shipments of vaccines have been determined to have been exposed to extreme temperatures.

Thus, current temperature monitoring systems may be both inadequate (e.g., only providing information about whether the temperature has been over or under a certain threshold for a certain period of time) or inaccurate (e.g., unable to account for temperature gradients due to vents and human error, and the significant amount of human intervention in placing vaccine vials and water bottles in a refrigerator unit). In addition, current temperature monitoring systems may be cumbersome (e.g., inserting a probe into a buffer solution, or requiring a human user to monitor readings from an EFI by using a DDL).

The embodiments described herein solve this problem by providing an apparatus comprising a first flexible substrate with a plurality of slits and temperature sensors. The first flexible substrate can be made of silicone or another similar material. The slits can be arranged around a center of the first flexible substrate, with the temperature sensors arranged between a pair of slits. When an object is inserted into an orifice created by the slits, the slits bend down and expand, such that the object is held in place with the flaps of the first flexible substrate. That is, the elastic pressure between the slits and the surface of the object allows the temperature sensors to remain in constant contact with the object (i.e., to maintain or keep contact with the object). Thus, this flexible cross slit mechanism can both house and sense the vial at the same time.

The slits can be arranged around the center of the first flexible substrate in a uniform or a non-uniform manner, depending on the shape of the object to be inserted into the created orifice. The slits can also be arranged around a central location of the first flexible substrate, in a uniform or a non-uniform manner. The temperature sensors can be arranged between or equidistantly between a pair of slits. The object can be of a symmetrical shape (e.g., a vaccine vial) or of a non-symmetrical shape (e.g., a frozen tuna fish).

In addition, the temperature sensors may be electronically printed in any configuration on the flexible substrate. For example, the temperature sensors can be electronically printed on a large sheet, and the system can create any number of different configurations of the slit openings and temperature sensors for any given use case. This is an improvement over pre-formed stencils, and can allow for dynamic printing of the sensors of the apparatus in any configuration, as needed.

Furthermore, by providing temperature sensors which are in constant contact with each object, the embodiments described herein solve the problem of non-locality in the conventional systems, and also allow a user to log the data for each individual object separately as opposed to the conventional method of calculating an average temperature for all objects in a single refrigerator.

Thus, the embodiments described herein provide accurate measurement of the temperature in storage units or transports units, which can result in a more efficient and effective system for both storage and transport. For example, using the described apparatus can result in a decrease in both the amount of wasted vaccine (e.g. the physical waste incurred from discarding damaged or unusable vaccines) and the financial cost incurred in creating, storing, and transporting vaccines which have lost their potency. The described apparatus can also result in a decrease of potential wasted human efforts to prevent an epidemic, e.g., by inaccurately measuring the temperature, where a no longer potent vaccine may be administered and result in ineffectively preventing an epidemic.

The terms "cross slit" and "slit" are used interchangeably in this disclosure, and can refer to a cut or an opening in a flexible substrate. These slits may be referred to as "cross slits" because a shape created by a certain number of slits (such as four) may look similar to a cross-shaped object. In some embodiments, these slits may be referred to as "cross slits" even when the shape created by the number of slits does not look similar to a cross-shaped object. In other embodiments, a cross slit can refer to the portion of the flexible substrate onto which the temperature sensor is electronically printed.

In the embodiments described herein, the sensors are depicted as temperature sensors. However, the described apparatus can include any type of sensor which can measure a characteristic of an object inserted into the slits of the flexible substrate, including a measure of moisture or humidity content, a level of radiation, etc.

Figure 1:
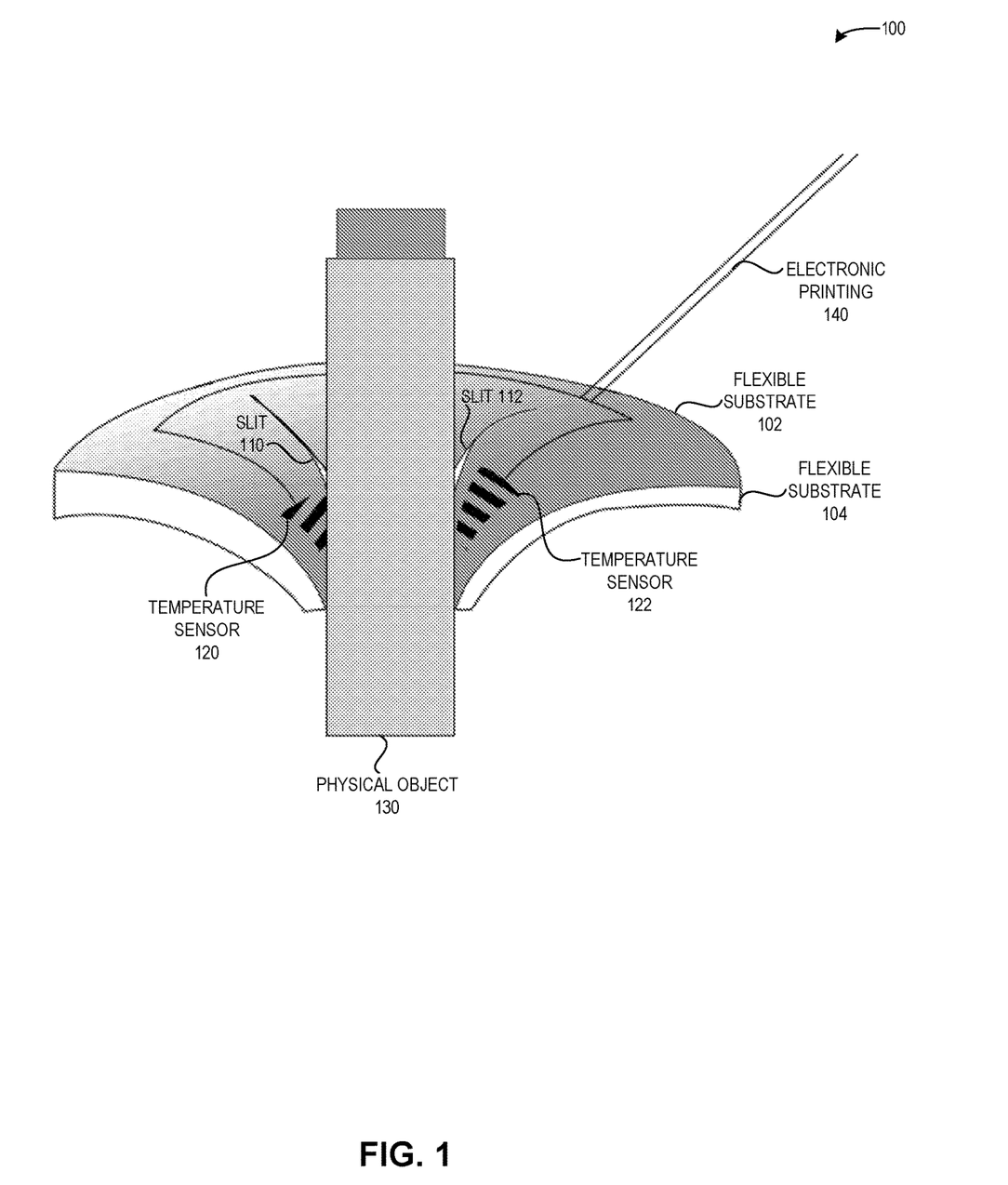
FIG. 1 illustrates a cross-sectional view of an exemplary apparatus, including a first flexible substrate with slits and temperatures sensors, and a physical object inserted into an orifice created by the slits and in contact with the temperature sensors, in accordance with an embodiment of the present application.

Exemplary Apparatus: Cross-Section View of Flexible Substrate with Slits and Temperature Sensors FIG. 1 illustrates a cross-sectional view of an exemplary apparatus 100, including a first flexible substrate with slits and temperatures sensors, and a physical object inserted into an orifice created by the slits and in contact with the temperature sensors, in accordance with an embodiment of the present application. Apparatus 100 can include a first flexible substrate 102 with a plurality of slits (e.g., slits 110 and 112) and at least one temperature sensor (e.g., temperature sensors 120 and 122). A temperature sensor can be arranged between a pair of slits in a uniform manner (e.g., equidistantly between a pair of slits). The temperature sensor can also be arranged between a pair of slits in a non-uniform manner (e.g., not equidistantly between each pair of slits). The slits can be arranged around a center of a flexible substrate, in a uniform or a non-uniform manner. The slits can also be arranged around a central location of the flexible substrate, in a uniform or a non-uniform manner.

The temperature sensors may be electronically printed (via an electronic printing function 140) onto first flexible substrate 102, which may be of a flexible material such as silicone, a thin plastic film, or other flexible material onto which an electronic sensor may be printed. In some embodiments, first flexible substrate 102 may be adhered to a second flexible substrate 104, using an adhesive means such as paste, tape, or glue. The adhesive means may include a surface-specific adhesive which depends on the features of the condition of the two parts (i.e., the two substrates) which are to be adhered together, including but not limited to: a roughness of a part; a smoothness of a part; a porosity of a part; whether a part is coated or uncoated; a cleanliness of a part; a flexibility of a part; a size of a part; and a surface energy of a part.

Physical object 130 can be inserted into an orifice created by slits 110 and 112, while temperature sensors 120 and 122 can be configured to maintain contact with physical object 130. That is, slits 110 and 112 result in "flaps" in flexible substrate 102, which flaps include the temperature sensor, which in turn can maintain a constant contact with physical object 130. In environment 100, physical object 130 is depicted as an object which has a symmetrical shape, such as a vaccine vial which can hold a liquid or other material.

In some embodiments: physical object 130 can be an object with a non-symmetrical shape (e.g., a large frozen tuna fish); slits 110 and 112 can be arranged in a non-uniform manner around the center (or a central location) of flexible substrate 102; and temperature sensors 120 and 122 can be arranged between a pair of slits in a non-uniform manner (e.g., on flaps of flexible substrate 102 created by inserting physical object 130 into an orifice created by slits 110 and 112).

In addition to the plurality of slits and at least one temperature sensor, flexible substrate 102 can include an insertion means for holding an object inserted into an orifice created by the slits and maintaining contact by the temperature sensor with the object. For example, the insertion means of flexible substrate 102 can hold physical object 130 inserted into the orifice created by slits 110 and 112, and can also maintain contact by temperature sensors 120 and 122 with physical object 130, as described above. The insertion means can also provide mechanical support to physical object 130, e.g., a supportive means which works with the insertion means to hold physical object 130 in place in the flexible flaps created by insertion of physical object 130 into the created orifice of the flexible substrate.

In the embodiments described herein (including as related to FIGS. 1, 2, 3, and 5), the physical object is depicted as a vaccine vial. However, the described apparatus can be used with any physical object (including both symmetrical and non-symmetrical shapes), and the apparatus can also be used in fields other than vaccine storage and transport, including but not limited to the storage, transport, and handling of perishable items, food products, chemicals, medication, and other biological products.

Data obtained from temperature sensors 120 and 122 can be transmitted to or retrieved by a controller device or a computing device through a network, as described below in relation to FIG. 5. This data can include a reading from temperature sensors 120 and 122 at a particular time t1. The reading can indicate a temperature of physical object 130 at time t1. Such readings can be transmitted to (or retrieved by) a computing device over a predetermined period of time (e.g., a duration of time to transport the physical object on a transport vehicle from a source storage facility to a destination storage facility). The readings may also be transmitted to a computing device at a periodic predetermined interval (e.g., once every five minutes).

Thus, flexible substrate 102 can also include a measuring means for monitoring, over a predetermined period of time or at a periodic predetermined interval, a temperature obtained from temperature sensors 120 and 122, which are in contact with inserted physical object 130.

Figure 2:
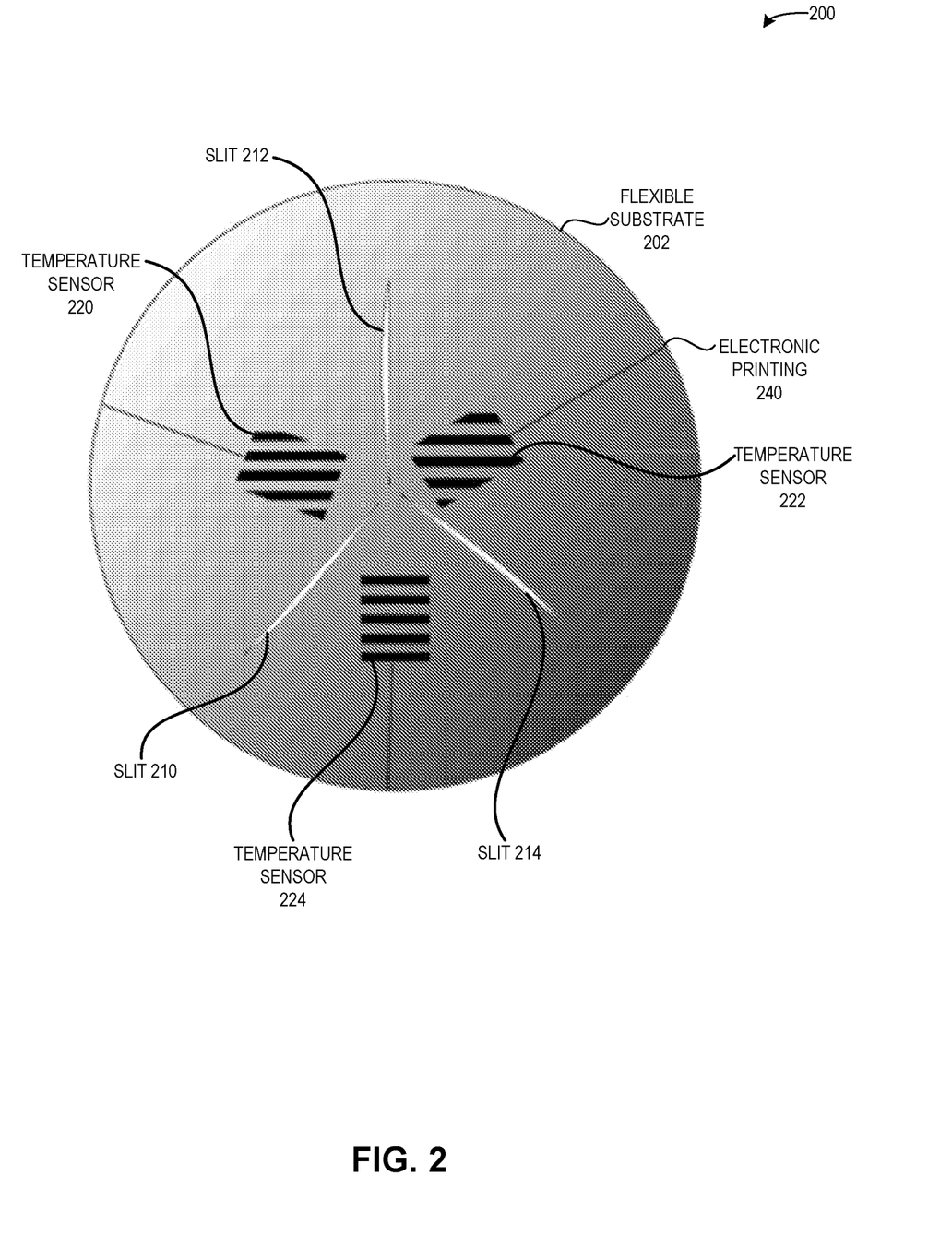
FIG. 2 illustrates a bird's eye view of an exemplary apparatus, including a first flexible substrate with slits and temperatures sensors, in accordance with an embodiment of the present application.

Exemplary Apparatus: Bird's Eye View of Flexible Substrate with Slits and Temperature FIG. 2 illustrates a bird's eye view of an exemplary apparatus 200, including a first flexible substrate with slits and temperatures sensors, in accordance with an embodiment of the present application. Apparatus 200 can include a flexible substrate 202, a plurality of slits 210, 212, and 214, and temperature sensors 220, 222, and 224. Temperature sensors 220-224 may be electronically printed (via an electronic printing function 240) onto flexible substrate 202. Furthermore, flexible substrate 202 may be adhered to another flexible substrate (not shown), using an adhesive means, as described above in relation to FIG. 1.

Apparatus 200 depicts the slits arranged in a uniform manner around a center of flexible substrate 202, e.g., arranged equally around and radiating outward from the center of flexible substrate 202. Apparatus 200 further depicts each temperature sensor arranged in a uniform manner (i.e., equidistantly) between a pair of slits.

An object can be inserted into an orifice created by slits 210-214, which can result in or cause the temperature sensors on the flaps of flexible substrate 202 to maintain contact with the inserted object, as described above in relation to the insertion means and the measuring means of FIG. 1.

Exemplary Embodiment: Tray for Holding Vaccine Vials

Figure 3:
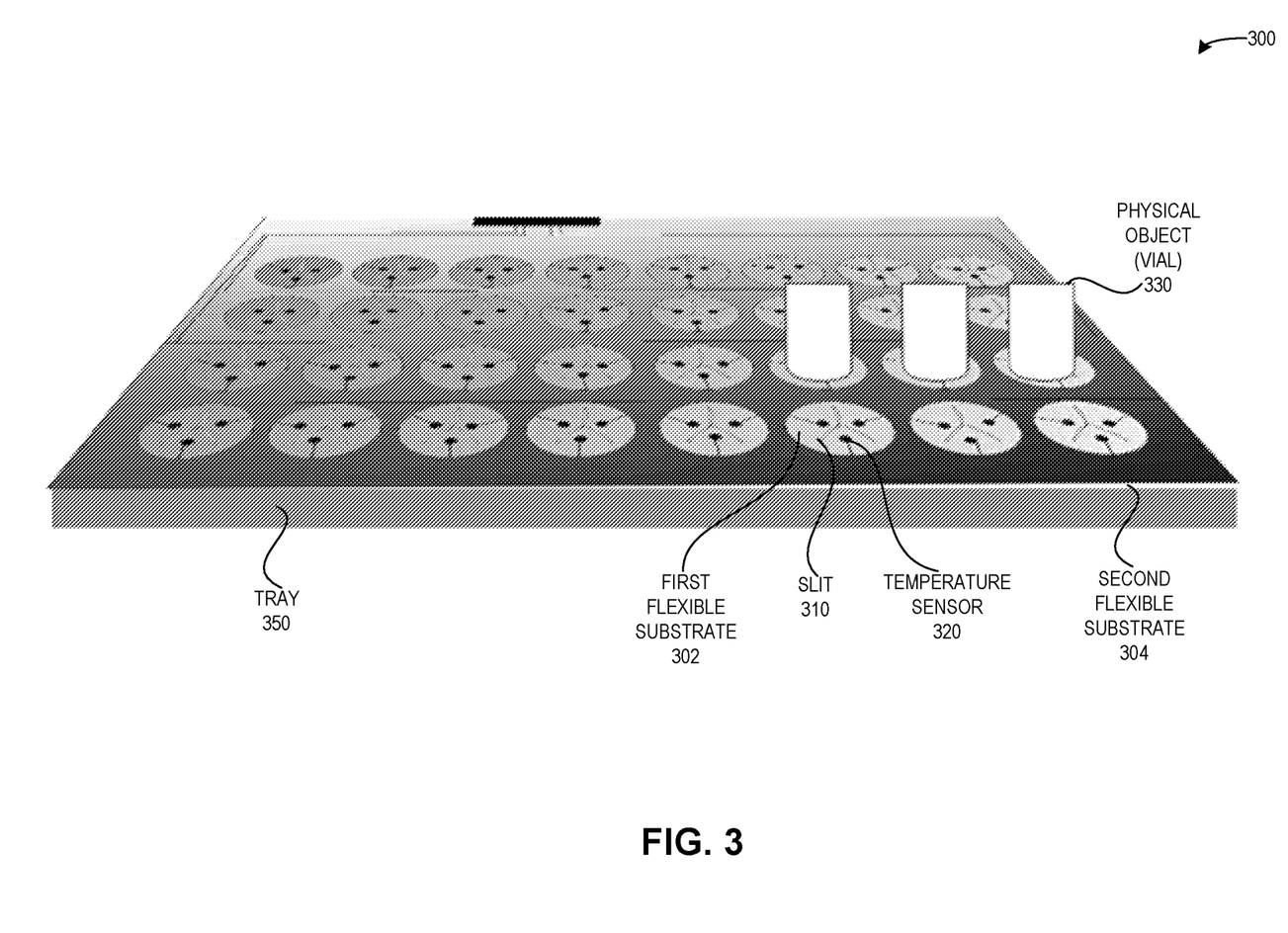
FIG. 3 illustrates an apparatus which includes a tray with a plurality of orifices created by slits in an exemplary flexible substrate, in accordance with an embodiment of the present application.

FIG. 3 illustrates an apparatus 300 which includes a tray 350 with a plurality of orifices created by slits in an exemplary flexible substrate, in accordance with an embodiment of the present application. Tray 350 can include a first flexible substrate 302 with a plurality of slits (e.g., slit 310) and at least one temperature sensor (e.g., temperature sensor 320). Tray 350 can also include a second flexible substrate 304, which includes a plurality of first flexible substrates arranged in a uniform manner on second flexible substrate 304. That is, tray 350 can include a number of evenly spaced first flexible substrates (like first flexible substrate 302) which are adhered to second flexible substrate 304 using the adhesive means described above in relation to FIG. 1. Tray 350 can include a number of physical objects (such as a physical object (vial) 330)), which can be inserted into an orifice created by the slits of a first flexible substrate. Tray 350 can itself be stored or placed in a storage unit, e.g., slid into racks with guide rails in a horizontal manner, and "stacked" while suspended along the guide rails of the rack.

Exemplary Method for Facilitating Temperature Measurement of an Object

Figure 4:
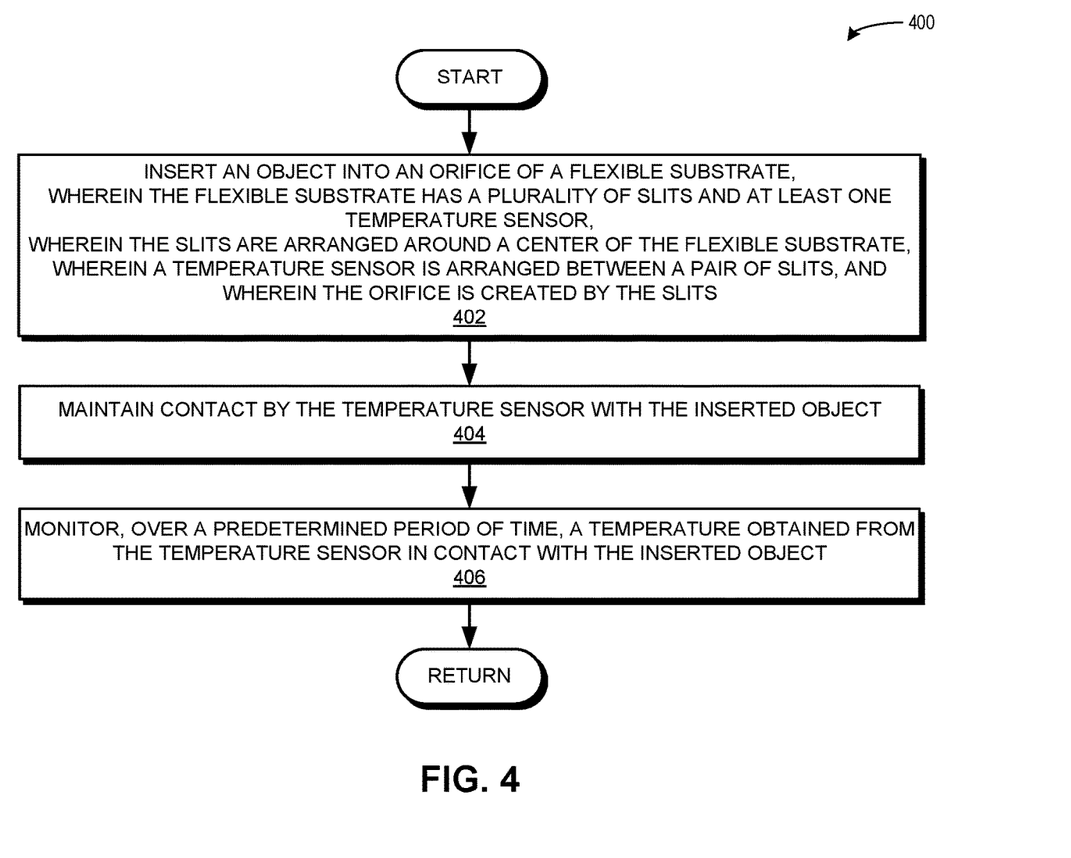
FIG. 4 presents a flow chart illustrating a method for facilitating temperature measurement of an object, in accordance with an embodiment of the present application.

FIG. 4 presents a flow chart 400 illustrating a method for facilitating temperature measurement of an object, in accordance with an embodiment of the present application. During operation, a system (or a user) can insert an object into an orifice of a flexible substrate, wherein the flexible substrate has a plurality of slits and at least one temperature sensor, wherein the slits are arranged around a center of the flexible substrate, wherein a temperature sensor is arranged between a pair of slits, and wherein the orifice is created by the slits (operation 402). The system can maintain contact by the temperature sensor with the inserted object (operation 404). The system can monitor, over a predetermined period of time, a temperature obtained from the temperature sensor in contact with the inserted object (operation 406).

Exemplary Network Environment

Figure 5:
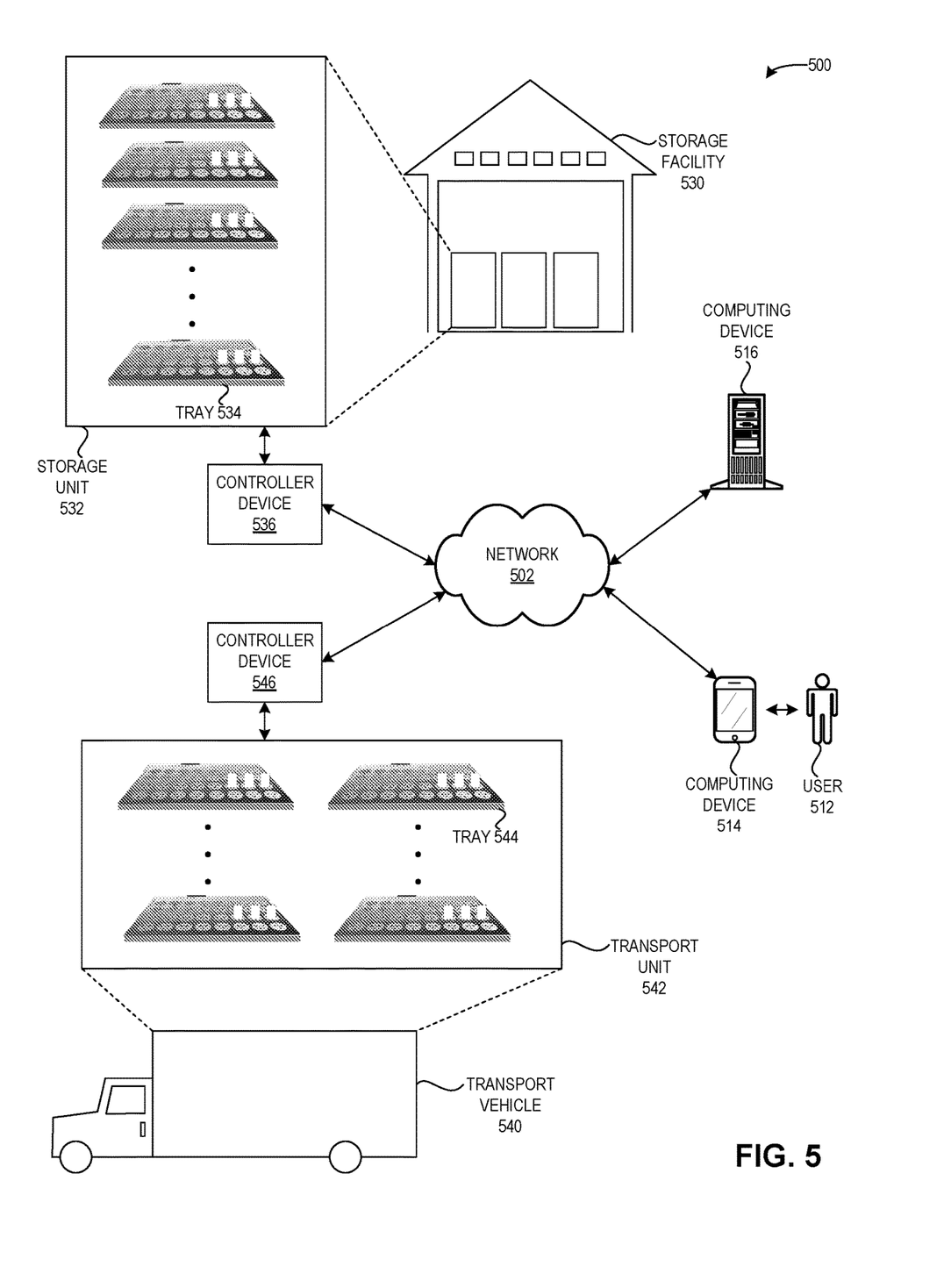
FIG. 5 presents an exemplary network environment, including a storage facility and a transport unit which use the flexible substrate, in accordance with an embodiment of the present application.

FIG. 5 presents an exemplary network environment 500, including a storage unit 532 and a transport unit 542 which use the flexible substrate, in accordance with an embodiment of the present application. Environment 500 can include: a user 512 with an associated computing device 514; a computing device 516; a storage facility 530; a controller device 536; a transport vehicle 540; and a controller device 546. Computing device 514 can be a mobile computing device, tablet, laptop, desktop computer, or any other computing device. Computing device 516 can be a computer, a server, or any other computing device. Storage facility 530 can include multiple storage units (e.g., storage unit 532), and each storage unit can include multiple trays (e.g., a tray 534). Storage unit 532 can be a refrigerated unit. Tray 350 can be similar to tray 350 of FIG. 3, and can include multiple temperature sensors arranged as described herein. Similarly, transport vehicle 540 can include multiple transport units (e.g., transport unit 542), and each transport unit can include multiple trays (e.g., a tray 544). Transport unit 542 can be a refrigerated unit. Tray 544 can be similar to tray 350 of FIG. 3, and can include multiple temperature sensors arranged as described herein.

During operation, controller device 536 can obtain readings from the multiple temperature sensors included in the trays of storage unit 532, and controller device 546 can similarly obtain readings from the multiple temperature sensors included in the trays of transport unit 542. Controller devices 536 and 546 can communicate with computing devices 514 and 516 via a network 502. Computing device 514 can be installed with software on a platform which allows user 512 to monitor the temperatures recorded by the multiple temperature sensors in storage unit 532 and transport unit 542, over a predetermined period of time or at a periodic predetermined interval. Computing device 516 can store the data obtained from controller devices 536 and 546, and can transmit the obtained data as requested by user 512, via computing device 514.

If user 512 determines that the temperature has either exceeded or fallen below a certain predetermined threshold for longer than a predetermined period of time, user 512 can take an action to investigate further, or to remediate the problem, e.g., to send a facilities administrator or technician to investigate storage unit 532 in storage facility 530, or to send a maintenance technician or other personnel in close proximity to (e.g., within a predetermined reasonable distance from) a current location of transport vehicle 530 to investigate transport unit 542.

Computing device 516 can also store conditions which trigger sending a notification message to computing device 514. Upon determining that a certain stored condition has been met or triggered, the system can send a notification to user 512, via computing device 514. The notification can be a message which alerts the user that the temperature has either exceeded or fallen below a certain predetermined threshold for longer than a predetermined period of time. The system or the user can configure the predetermined thresholds which trigger the notification, or use a default setting.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. An apparatus, comprising:
a first flexible substrate with a plurality of slits and one or more sensors,
wherein the slits are arranged around a center of the first flexible substrate,
wherein a sensor of the one or more sensors is arranged between a pair of the slits, and
wherein when an object is inserted into an orifice created by the slits, the sensor is configured to maintain contact with the object,
thereby allowing a measurement by the sensor of a characteristic of the object over a predetermined period of time.

2. The apparatus of claim 1,
wherein the slits are further arranged equally around and radiating outward from the center of the first flexible substrate, and
wherein the sensor is further arranged equidistantly between the pair of the slits.

3. The apparatus of claim 1,
wherein the first flexible substrate is adhered to a second substrate, and
wherein the second substrate is one or more of:
a second flexible substrate; and
a non-flexible substrate.

4. The apparatus of claim 1,
wherein the object has a symmetrical shape.

5. The apparatus of claim 1, wherein the object is one or more of:
a container which holds a liquid, wherein when the container is inserted into the orifice, the sensor is configured to maintain contact with the container; and
a solid physical object, wherein when the solid physical object is inserted into the orifice, the sensor is configured to maintain contact with the solid physical object.

6. The apparatus of claim 1, further comprising:
a second flexible substrate which includes a plurality of the first flexible substrates arranged in a uniform or a non-uniform manner on the second flexible substrate.

7. The apparatus of claim 1,
wherein the slits are further arranged in a non-uniform manner around the center of the first flexible substrate, and
wherein the object has a non-symmetrical shape.

8. The apparatus of claim 1,
wherein the sensor is printed electronically onto the first flexible substrate,
wherein the sensor includes a temperature sensor, and
wherein the measured characteristic of the object includes a temperature of the object.

9. The apparatus of claim 1,
wherein the plurality of slits includes at least three slits, and
wherein the at least one sensor includes at least three sensors.

10. A first flexible substrate, comprising:
a plurality of slits and one or more sensors,
wherein the slits are arranged around a center of the first flexible substrate, and
wherein a sensor of the one or more sensors is arranged between a pair of the slits;
an insertion means for holding an object inserted into an orifice created by the slits and maintaining contact by the sensor with the object; and
a measuring means for monitoring, over a predetermined period of time, a characteristic of the object obtained from the sensor in contact with the inserted object.

11. The first flexible substrate of claim 10,
wherein the slits are further arranged equally around and radiating outward from the center of the first flexible substrate, and
wherein the sensor is further arranged equidistantly between the pair of the slits.

12. The first flexible substrate of claim 10, further comprising:
an adhesive means for adhering the first flexible substrate to a second substrate, wherein the second substrate is one or more of:
a second flexible substrate; and
a non-flexible substrate.

13. The first flexible substrate of claim 10,
wherein the object has a symmetrical shape.

14. The first flexible substrate of claim 10, wherein the object comprises:
a container,
wherein the insertion means is further for holding the container and maintaining contact by the sensor with the container; and
a storing means for holding a liquid in the container.

15. The first flexible substrate of claim 10, wherein the object comprises:
a solid physical object,
wherein the insertion means is further for holding the solid physical object and maintaining contact by the sensor with the solid physical object.

16. The first flexible substrate of claim 10, further comprising:
a second flexible substrate which includes a plurality of the first flexible substrates arranged in a uniform or a non-uniform manner on the second flexible substrate.

17. The first flexible substrate of claim 10,
wherein the slits are further arranged in a non-uniform manner around the center of the first flexible substrate, and
wherein the object has a non-symmetrical shape.

18. The first flexible substrate of claim 10,
wherein the sensor is printed electronically onto the first flexible substrate,
wherein the sensor includes a temperature sensor, and
wherein the monitored characteristic obtained from the temperature sensor includes a temperature of the object.

19. The first flexible substrate of claim 10,
wherein the plurality of slits includes at least three slits, and
wherein the at least one sensor includes at least three sensors.

20. A method for facilitating measurement of an object, the method comprising:
inserting the object into an orifice of a flexible substrate,
wherein the flexible substrate has a plurality of slits and one or more sensors,
wherein the slits are arranged around a center of the flexible substrate,
wherein a sensor of the one or more sensors is arranged between a pair of the slits, and
wherein the orifice is created by the slits;
maintaining contact by the sensor with the inserted object; and
monitoring, over a predetermined period of time, a characteristic of the inserted object obtained from the sensor in contact with the inserted object.

* * * * *